United States Patent [19]

Pierce

[11] Patent Number: 4,647,182
[45] Date of Patent: Mar. 3, 1987

[54] METHOD AND APPARATUS FOR PRODUCTION OF COLOR IMAGES

[76] Inventor: Michael L. Pierce, 10041 N. 76th Pl., Scottsdale, Ariz. 85258

[21] Appl. No.: 719,573

[22] Filed: Apr. 3, 1985

[51] Int. Cl.4 .................. G03G 15/01; G03G 13/01
[52] U.S. Cl. ................................ 355/4; 355/32; 355/77; 430/42
[58] Field of Search ............. 355/3 R, 4, 32, 77; 430/42, 126

[56] References Cited

U.S. PATENT DOCUMENTS

| | | | |
|---|---|---|---|
| 3,832,170 | 8/1974 | Nagamatsu et al. | 355/4 X |
| 3,833,293 | 9/1974 | Serio et al. | 355/4 X |
| 3,838,919 | 10/1974 | Takahashi | 355/4 |
| 3,854,942 | 12/1974 | Akman | 355/4 X |

Primary Examiner—Fred L. Braun
Attorney, Agent, or Firm—Harry M. Weiss & Associates

[57] ABSTRACT

Apparatus and method for transferring a color image from an original document to a film or to an output paper. The apparatus involves the formation of the component monochromatic images containing selected color component information in a monochromatic toner particle image configuration. The separate images of the toner configurations are exposed onto a photosensitive film to reconstruct the original document. The component images can be formed on a clear material or, preferably, on a transparent colored material, the colored material serving to eliminate the need for a filter for each of the color component exposures needed to reconstruct the original image. In a second embodiment, the component images can be formed on transparent regions of electrostatic photoconducting drum. A suitable light source placed in the middle of the drum, can expose a film on a platten near the surface. Again the transparent photoconducting material of the drum can have a color in each of a plurality of predetermined sections to eliminate the need for filters during reconstruction of an image from component monochromatic images.

12 Claims, 2 Drawing Figures

METHOD AND APPARATUS FOR PRODUCTION OF COLOR IMAGES

BACKGROUND OF THE INVENTION

1. Field of the Invention

This invention relates generally to the production of color images and, more particularly, to the use of a plurality of electrostatic images encoded with monochromatic information to form color images. The monochromatic electrostatic images can be combined to produce a composite color image on photo-sensitive film.

2. Discussion of the Related Art

It is known in the related art to utilize the xerographic process to produce color images. The color images are typically decomposed into three monochromatic images and (in some embodiments) a grey-scale image. The images are utilized in a predetermined sequence to subject an output matrix, such as a paper matrix, to the xerographic process. During each xerographic operation, a different color toner, as well as black toner when a grey-scale is utilized, is applied to the matrix. The color toner particles are affixed to the output matrix and, when fused, produce the color image.

The same type of process can be utilized to formulate transparencies or color image negatives. The basic technique of decomposition of the images and reconstruction by means of colored, electrostatically, charged particles affixed to the output matrix is generally similar. However, complementary color images are used in production of negatives. The technique is generally complicated when a plurality of colored toner particles are fused together to form a color image. The difficulty of maintaining color integrity for the multiplicity of color combinations and the difficulty of adequate fusing of the components compromise the quality. This compromise in quality is compounded by the number of toner transfer stations required to supply the various color toner particles to the electrostatic media.

A need has therefore been felt for apparatus and method to produce a color image using the xerographic technique to provide a photo-sensitive-type output media. The use of photo-sensitive-type materials replacing a polychromatic output matrix generally eliminates problems involved in the deposition of an image into intermediate electrostatically formed images composed of charged color particles and the subsequent combination into a single color image.

SUMMARY OF THE INVENTION

It is therefore an object of the present invention to provide method and apparatus for an improved technique of production of color images.

It is another object of the present invention to provide method and apparatus for an improved color image production utilizing the electrostatic processes to provide the intermediate images that are a representation of selected monochromatic information.

It is yet another object of the present invention to provide improved apparatus and method for producing a color image that involves decomposition of an original color image into three monochromatic electrostatic images and reconstructing the composite image by exposing a photo-sensitive film to the monochromatic images illuminated by radiation of the appropriate wavelength.

These and other objects are accomplished, according to the present invention, by providing a transparent matrix for receiving electrostatically charged toner particles in an electrostatic copy apparatus. The transparent matrix is provided with a series of monochromatic images and the monochromatic images are transferred to a station where photo-sensitive film is exposed through these monochromatic images by means of radiation of a pre-selected wavelength corresponding to the color component that the monochromatic image represents. The exposed film is then transferred to a developing apparatus and thereafter separated from the photo-sensitive matrix to provide a color image.

These and other features of the invention will be understood upon reading of the following discussion along with the drawings.

DESCRIPTION OF THE PREFERRED EMBODIMENT

Detailed Description of the Figures

Figure 1:
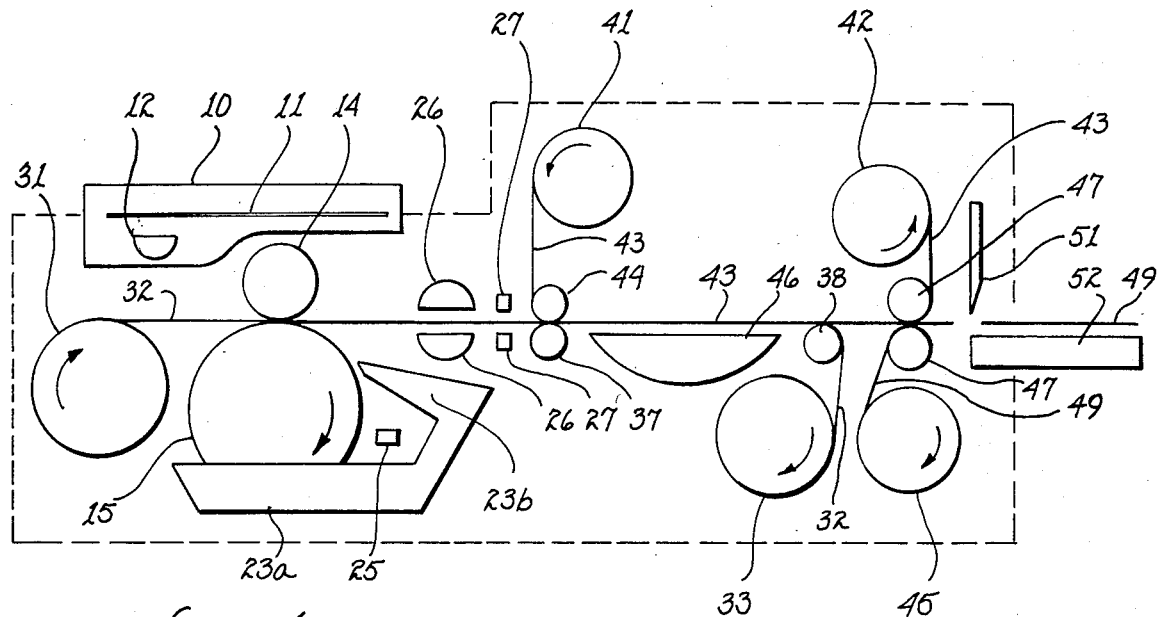
FIG. 1 is a schematic cross-section view of the apparatus for providing a color image according to the present invention.

Referring now to FIG. 1, element 10 is an image input device for an electrostatic image producing apparatus. The apparatus includes a plate 11 for positioning an original document and a scanning apparatus 12 for encoding the information of the document into a form suitable for eventual application of the information to a charged photoconducting drum 15. The drum 15 has a toner recovery apparatus 23b and a toner tray 23a for respectively removing toner from the photoconducting drum 15 and for applying a toner coating determined by an electrostatic charge stored on the drum. An electrostatic charge is applied to the photoconducting drum 15 after the toner recovery has taken place at station 23b. Information is imposed on the drum 15 by an optical apparatus 25 that can be, for example, a laser scanning device. The optical apparatus 25 produces a pattern on the photoconducting drum by varying the conductivity of the drum in a manner that is related to the original document. The charged area of drum 15, passing through the toner tray 23a, has toner particles attracted thereto in a manner that reproduces an image. The drum 15 rotates the latent image charge so that the latent image charge comes in contact with a clear film 32, the film 32 having the property that it is capable of maintaining an electrostatic charge or in some manner retaining the latent image toner particles originally positioned on the drum 15. The clear film is unrolled from supply drum 31, passes through the electrostatic imaging apparatus and other apparatus and is stored on drum 33. The clear film 32 moves past the drum 15 at the same linear speed as the toner surface of the drum and is constrained by pressure roller 14. The toner particles are transferred, at least in part, to the clear film 32. The clear film 32, coated with toner particles, is then passed through fusing elements 26. The fusing elements serve to affix the latent image toner pattern, initially formed on the drum 15 and transferred to the clear film 32, for transport to another location without distortion. Elements 27 are position sensors and serve ultimately to control the registration of the clear film images when multiple images are transferred. The clear film 32 is forced between rollers 37 and 44 at which time the clear film (with toner image) is brought into registration with the photo-sensitive film 43 that is provided from roller 41. The photo-sensitive film 43 and the clear film 32 pass before a suitable light source (either a continuous source or a flash-pulsed source), 46 which exposes the photo-sensitive film through a pattern resulting from the toner image stored on the clear film. For a multiple exposure process, i.e. in which a plurality of images contain the selected spectral information necessary to produce composite color images, film 43 is halted and a plurality of images from toner images on the clear film 32 are exposed onto the photo-sensitive film 43. The clear film then passes over roller 38 and is taken up on rewind roll 33. Meanwhile, the photo-sensitive film 43 continues to travel between pressure nip rollers 47. A supply roll 45 provides a suitable output media to transfer the image from the photo-sensitive film to the output media 49 itself. The photo-sensitive film is thereafter stored on rewind roller 42, while the output media is cut by apparatus 51 and eventually the finished copy on the output media 49 is stored in output tray 52.

Figure 2:
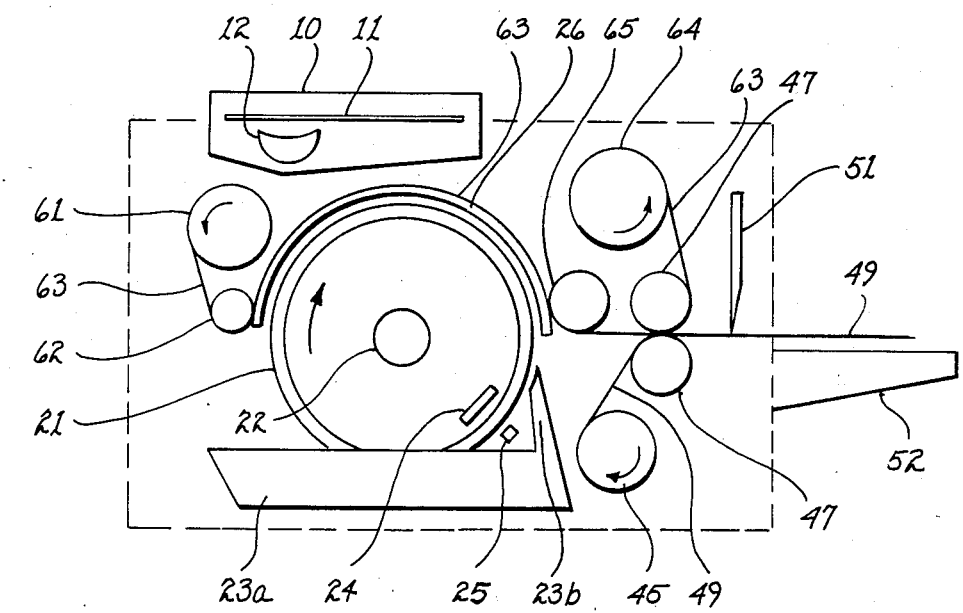
FIG. 2 is a second embodiment for providing a color image according to the present invention.

Referring next to FIG. 2, an alternative arrangement for obtaining the same image reconstruction is shown. Once again, the image is provided at station 10 wherein an original document on plate 11 is subjected to an optical scanning process by device 12. The result of the scanning process is the production of an image encoded with either optical or with electronic information that can be reproduced by an optical apparatus 25. The optical apparatus 25 is utilized after the toner removal stage 23b and prior to the application of toner to the photoconducting material 21 on the drum. It will be clear to those familiar with the art of electrostatic reproduction processes, that between station 23b and the optical apparatus 25, an electrostatic charge must be placed on the photoconductor drum. Once again, the image is stored on the photoconductor drum 21 in the form of an electrostatic charge pattern. However, in this case, the photoconductor coated drum 21 is fabricated using a transparent material. Optical shielding, indicated by element 24, is required for accurate image reproduction. The photoconductor drum 21 rotates carrying the electrostatic charge and the electrostatic charge produces a latent image by attracting charged toner particles. A photo-sensitive film 63 supplied from a storage roller 61 is positioned by a positioning roller 62 to be constrained to move across a platten 26. The constraint can be provided by tension on a curved surface or by a vacuum platten or by an electrostatic surface attraction. The platten 26, as well as the photoconducting drum 21, are transparent and, when the light source 22 positioned at the interior of the drum is energized, the latent image formed by the toner particles on the photoconducting material 21 is transferred to the photo-sensitive film 63. In the case of transfer of a multi-color image, the film 63 is halted and multiple exposures are made, one exposure for each selected composite color component. The film is then advanced past positioning roller 65 and forced between pressure nip rollers 47 at which point the output media 49 is pressed in contact with the photo-sensitive film and the color image is transferred to the output media. The cutter 51 cuts the output media 49 and the finished product is deposited in output tray 52.

Operation of the Preferred Embodiment

The operation of the preferred embodiment depends on several important features. The xerographic apparatus is used to form separately a monochromatic image equivalent to a selected primary color component of a composite color image on the photo-sensitive matrix. As is typical in the reconstruction of photographic composite color images, three (or alternately four) color images will be required to expose the film and provide a composite full color image. The process can be simplified when the translucent image storage film itself can have appropriate color regions rather than being a neutral transparent color. Thus, when the light source 46 is used to expose the subsequent monochromatic images, the color transparent matrix itself provides the light filtering functions, rendering the positioning of different filters before the excitation light source unnecessary. Similarly, in the apparatus disclosed in FIG. 2, the transparent photoconducting drum 21 can have multiple color regions. When the photo-sensitive film matrix 63 is halted, the photoconductor drum 21 is rotated into position and the light source 22 is energized, the color of the photoconducting material itself serving as the filter.

It will be clear that the process of transferring the image from the xerographic images to the output media 49 can be omitted and the exposed photo-sensitive film itself can be developed and cut and used as a finished copy.

With respect to the film chemistry that would be used in the materials designated by 43 or 63, the color dry silver paper, manufactured by the Minnesota Mining and Manufacturing Company a photo-sensitive material similar to the micro-encapsulated imaging film, manufactured by the Mead Imaging, Inc. division of Mead Corporation, or other similar color or monochromatic imaging products can be used as the photo-sensitive material. With the negative acting micro encapsulated imaging films, regions are implanted in an appropriate matrix that, when not activated by radiation of the appropriate wavelength, result in the corresponding color being produced and subsequently transferred to a second matrix when a second matrix is pressed with sufficient force against the first matrix. The pressure ruptures the micro encapsulated areas that have not been irradiated, causing color to be transferred to the second matrix in these areas. The Mead micro-encapsulated film has the areas producing color deactivated by radiation of a wavelength different than the wavelengths of the produced color. The wavelength difference can be accommodated by appropriate choice of filter parameters.

The Mead micro-encapsulated film material consists of a matrix of evenly distributed microcapsules coated onto a substrate film and containing chemical substances that produce the primary colors of yellow, cyan, and magenta when ruptured by mechanical pressure. Composite color images can be reproduced by exposing the Mead film to three distinct wavelengths of light through appropriate image masks, The microcapsules reopened to this radiation by polymerizing into non-ruptible heads, leaving the non-exposed microcapsules susceptable to rupture to release their color material.

Finally, regular photographic films of the "instant" developing type may also be utilized as the photo-sensitive film (63 or 93). In this case, the pressure nip rollers

(47) may be used to rupture and distribute the appropriate developer chemistry contained within the construction from Eastman Kodak Company or Polaroid Corporation could then be used and eliminate the need for a separate supply of output media (49) onto which the image must otherwise be transferred prior to output.

It will also be clear that for the 3M dry silver paper, the nip rollers 47 will be replaced by heating rollers or similar means for the image development.

It will be clear that in FIG. 2, the registration of the drum must be set quite precisely for sharp reconstruction of the images. With respect to the registration of the clear film of FIG. 1, the various colors of the portions of the translucent film, that provide the filtering action, can help provide for registration.

The transfer of the optical image from the imager 10 to the optical system 25 can take a multiplicity of forms. Optical system 25 can, for example, be a laser that scans the photoconducting surface of the drum response to an encoding by a scanner 12 in the original document entry. This laser control has the advantage that, although the document entry portion 10 is shown as associated with the apparatus, the optical entry apparatus can in fact, be at a distant location from the xerographic device and the laser scanning implementation of apparatus 25 can be controlled by a transmitted signal. In addition, the xerograhic device could be configured to produce composite color hardcopy through digital or analog communication of color or monochromatic image data from a computer host, thus acting as a printing peripheral device. Scanner 12 and optical apparatus 25 can, however, be implemented by a fiber optic system that in essence scans a moving segment of the original document and transfers the scanned signal to the electrostatic charge on the photoconducting drum. The fiber optic system requires the use of filters to provide for component-color images.

It will be clear that no significant difference in and principle can result from the use of the negative color image components as opposed to the positive color image components. The difference is important only in the selection of primary color components.

Referring once again to the embodiment shown in FIG. 2, the photo-sensitive film 63 and the surface containing the image are not in contact. Therefore, the light from flash lamp 22 must be collimated to provide sharp images.

The above description is included to illustrate the operation of the preferred embodiment and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. Apparatus for producing a color image, comprising:
    a transparent material capable of storage of an image formed by an electrostatic process;
    an electrostatic machine for applying a plurality of electrostatic images to said transparent material;
    photo-sensitive material responsive to a light source, said photo-sensitive material is proximately adjacent to said transparent material having electrostatic images formed thereon; and
    apparatus for exposing said photo-sensitive material to said plurality of images, each of said plurality of images is superimposed on said photo-sensitive materials by radiation of an appropriate spectral profile, said photo-sensitive material is a micro-encapsulated photo-sensitive material, said color image apparatus further including an output material and a transfer device for transferring an image from said photo-sensitive material activated by said superimposed images to said output material, said transparent material is comprised of a plurality of colored sections, said colored sections acting as filters that allow a preselected bandwidth or radiation to pass through while blocking other preselected bandwidths from passing to facilitate the utilization of a single radiation source to produce a plurality of color images, said electrostatic machine includes said transparent material as part of a rotatable drum, said plurality of electrostatic images being formed on said drum without being thermally fixed to said transparent material, said micro-encapsulated photo-sensitive material can be activated by radiation with a spectral content different from the spectral content of a said color image.

2. The color image producing apparatus of claim 1 wherein said photo-sensitive material is developed to provide a final image.

3. Apparatus for forming a color image, comprising:
    electrostatic image means for providing at least one image formed by electrostatic techniques, said at least one image having a pre-selected spectral relationship to said color image;
    photosensitive means; and
    exposure for exposing said at least one image on said photosensitive means, said exposed area of said photosensitive means having a pre-established spatial position on said at least one image being exposed on said photo-sensitive means by radiation having spectral characteristics to be determined by said pre-selected spectral relationship, said photosensitive means includes a medium having micro-encapsulated color regions, said apparatus further including means for transferring an image from said photo-sensitive means to said output medium, said micro-encapsulated color regions are activated by a radiation spectrum different from a color spectrum of said color image.

4. The apparatus of claim 3 wherein said predetermined spectral characteristic is provided by a medium upon which said at least one electrostatically formed image is placed.

5. The apparatus of claim 3 wherein said image formed by electrostatic technique is formed on a transparent region of a drum associated with said electrostatic image means, said exposure means including a radiation source on the interior of said drum, said photo-sensitive means having a predetermined spatial relationship with said drum.

6. The color image of claim 3 wherein said at least one image is comprised of a plurality of images, each of said plurality of images have a pre-selected spectral characteristics relative to said color image, and wherein said exposed plurality of images are superimposed on said photo-sensitive means.

7. The color image apparatus of claim 6 wherein said electrostatically formed images are fused on an intermediate transparent medium, each of said electrostatically formed images being stored on a region of said transparent intermediate medium having color determined by said pre-selected spectral relationship.

8. The color image apparatus of claim 3 wherein said image formed by said electrostatic image means results from scanning a charged photoconductor by a laser beam.

9. The color image apparatus of claim 3 wherein said color image in a reproduction of an original color image, said at least one image containing information pertaining to a preselected spectral profile of said original color image.

10. A method of producing a color image, comprising the steps of:

forming a plurality of images by an electrostatic imaging process, each of said plurality of images including information related to a predetermined spectral characteristics of said color image;

exposing said plurality of electrostatically formed images onto a photo-sensitive medium, wherein said plurality of exposures are superimposed, radiation performing said exposing step has a pre-established spectral characteristic; and developing said superimposed plurality of images in said photo-sensitive medium, said photosensitive medium is a micro-encapsulated material and said developing step includes transfer of an image from said micro-encapsulated material to an output material, said method of producing a color image further including the step of activating said micro-encapsulated material by a radiation spectrum different from the radiation spectrum of said color image.

11. The method of producing a color image of claim 10 wherein said forming step includes the step of forming each electrostatic image on a medium having a selected color, wherein said selected color is determined by said pre-established spectral transmission characteristics.

12. The method of producing a color image of claim 10 wherein said forming step includes the step of forming each of said plurality of images on the transparent surface of a drum in the apparatus forming said electrostatic image.

* * * * *